United States Patent [19]

Dryden

[11] 3,926,458
[45] Dec. 16, 1975

[54] TUBING ADAPTOR
[76] Inventor: Gale E. Dryden, 5835 N. Tacoma Ave., Indianapolis, Ind. 46220
[22] Filed: Jan. 8, 1974
[21] Appl. No.: 431,626

[52] U.S. Cl. .................................. 285/177; 285/235
[51] Int. Cl.² ......................................... F16L 25/00
[58] Field of Search .......... 285/177, 235, 236, 237, 285/254, 293; 16/2

[56] References Cited
UNITED STATES PATENTS

| 2,050,023 | 8/1936 | Sloyter | 285/293 |
| 2,690,470 | 9/1954 | Moorhead | 16/2 |
| 2,920,908 | 1/1960 | Mitchell | 285/236 X |
| 3,114,568 | 12/1963 | Buono | 285/235 |

FOREIGN PATENTS OR APPLICATIONS

| 589,978 | 1/1960 | Canada | 285/177 |
| 150,854 | 7/1955 | Sweden | 285/177 |
| 835,239 | 3/1952 | Germany | 285/236 |
| 1,491,988 | 3/1967 | France | 285/177 |

Primary Examiner—Dave W. Arola
Attorney, Agent, or Firm—Woodard, Weikart, Emhardt & Naughton

[57] ABSTRACT

An adapter for connection between different sizes of tubing is of flexible resilient material having a cup-shaped body and an aperture in the closed end (bottom) of the cup, with that end being shaped to provide a collar or flange at the aperture and which extends away from the cup, facilitating inversion to accommodate insertion of a smaller tube, and then reversion to the original configuration but surrounding the tube and providing a tape receiving surface providing a secure, gas-tight connection.

1 Claim, 6 Drawing Figures

U.S. Patent   Dec. 16, 1975   3,926,458
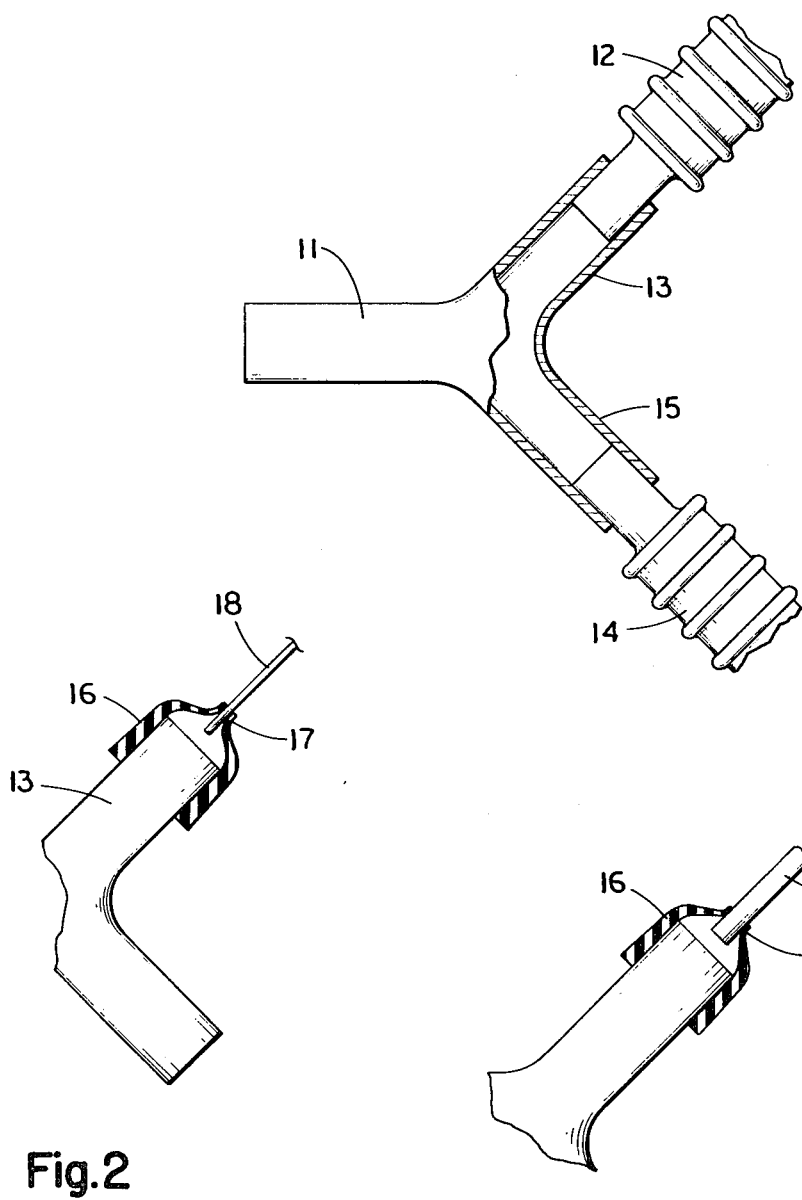
Fig. 1
PRIOR ART
Fig. 2
Fig. 3
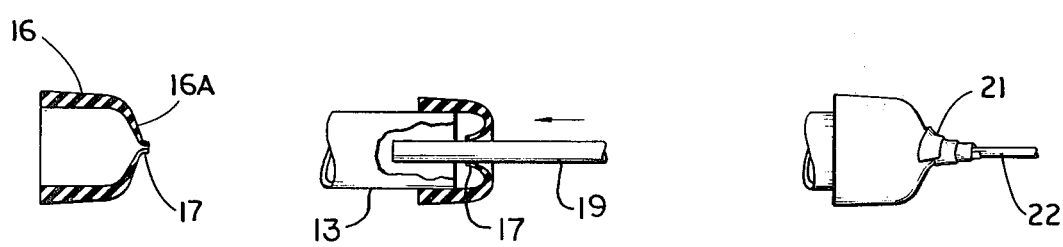
Fig. 4   Fig. 5   Fig. 6

TUBING ADAPTOR

BACKROUND OF THE INVENTION

1. Field of the Invention

This invention relates generally to tubing connections, and more particularly to an adapter facilitating connections between tubes having small or large differences in diameter.

2. Description of the Prior Art

Apparently there is a large amount of prior art in the subject of connections between tubes and pipes. Patents in this area and of which I am aware are as follows:

United States

| | | |
|---|---|---|
| 443,680 | Johnson | Dec. 30, 1890 |
| 603,222 | McLean | Apr. 26, 1898 |
| 865,860 | Brown | Sept. 10, 1907 |
| 1,253,145 | Carroll | Jan. 8, 1918 |
| 1,705,051 | Thompson | Mar. 12, 1929 |
| 2,071,780 | Aghnides | Feb. 23, 1937 |
| 2,304,114 | Moore | Dec. 8, 1942 |
| 2,131,721 | Hale | Sept. 27, 1938 |
| 2,144,419 | Slocumb | Jan. 17, 1939 |
| 2,244,280 | Aghnides | June 3, 1941 |
| 2,507,535 | Madsen | May 16, 1950 |
| 2,768,844 | Schadeberg | Oct. 30, 1956 |
| 2,784,864 | Giorgio | Mar. 12, 1957 |
| 3,366,404 | Lloyd | Jan. 30, 1968 |
| 3,388,705 | Grosshandler | June 18, 1968 |
| 3,486,730 | Potash | Dec. 30, 1969 |
| 3,584,901 | Willinger | June 15, 1971 |
| 3,680,896 | Cupit | Aug. 1, 1972 |

Canadian

| | | |
|---|---|---|
| 589,978 | Hofstetter | Jan. 5, 1960 |

Although the foregoing patents disclose a considerable variety of adapters and couplings, none of them combines the simplicity and versatility which are needed for optimum utilization with a variety of ranges of differences between sizes of tubing. Perhaps the most pertinent of these patents are the Canadian Pat. No. 589,978 issued Jan. 5, 1960, and the U.S. Pat. No. 3,388,705 issued to Grosshandler on June 18, 1968. In the Canadian patent, it is suggested that the inside diameter of the large tube end 1 be greater than the outside diameter of the small tube end by at least four times the wall thickness of the connecting hose piece. In the Grosshandler patent, a reinforcing ring is secured around the end to which the small tube is connected. That end is normally flat and perpendicular to the axis of the tubing aperture, when the item is in the relaxed, unstretched condition. Therefore, although it would seem to accommodate a range of sizes, it is more limited to the extent of the range, than what I think is needed.

SUMMARY OF THE INVENTION

Described briefly, in a typical embodiment of my invention, an adapter is made of a resilient flexible material, having a generally cup-shaped configuration but with a small aperture in the closed-end of the cup. The end is shaped to provide, in-effect, an axially extending flange around it, extending in the direction opposite the open end of the cup. The end wall and flange of the cup are tapered from a maximum near the outer circumference to a minimum at the edge of the aperture, to facilitate insertion and removal of tubes through the aperture, despite a substantial difference in sizes of such tubes, and yet provide a snug, gas-tight connection for even the smallest of tubes, and also enable further attachment and sealing by a tape wrapping.

BRIEF DESCRIPTION OF THE DRAWINGS

FIG. 1 is a drawing of a typical so-called Y connector of a type used in respiratory systems such as for underwater breathing, administration of anesthesia, and other purposes where a face mask is employed, together with hoses from each branch of the Y.

FIG. 2 is a diagram of a Y connector with the adapter of my invention connecting a very small tube to the Y connector.

FIG. 3 is a diagram similar to FIG. 2 but showing connection of a larger tube to the Y connector.

FIG. 4 is a section through a typical embodiment of the adapter in my invention in its relaxed condition.

FIG. 5 is a diagram representing the inversion of the tip end of the adapter during insertion of a tube.

FIG. 6 is a diagram of the adapter secured to a small tube and including an outer tape wrap for reinforcing the attachment and seal.

DESCRIPTION OF THE PREFERRED EMBODIMENT

Referring now to the drawings in detail, the Y connector 11 of FIG. 1 receives the hose 12 in the branch 13, and a hose 14 in the branch 15. These hoses are simply pushed into the branches, and the taper on either the hose fitting or the branch, serves to tighten and seal the connection. Of course, they can be pulled apart intentionally after use, if desired.

Referring now to FIG. 2, my adapter 16, made of a rubber or plastic material having flexibility desirable for performance as described hereinafter, as well as the resilience and surface characteristics necessary therefor, is mounted on the outside of the branch 13. It has a small central aperture in what would otherwise be the closed end (bottom) of the generally cup-shaped body of the adapter. This end has a sort of funnel shape, terminating in a central collar or flange 17 at the aperture. The aperture snugly receives a small piece of tubing 18, and thus the gas-tight connection is made between the branch of the Y connector and the small tube 18 which is much smaller in diameter. For the adapter, it seems that a flexible resilient material of low durometer is most suitable. A material known as "Kraton" marketed by the Shell Oil Company, has been found suitable.

In FIG. 3, the same adapter is used but the funnel-shaped portion thereof is stretched radially outward to receive a larger piece of tubing 19.

In the illustration of FIG. 4, it will be seen that the normal relaxed state of the adapter of my invention exhibits a generally cylindrical configuration for the circular portion of the body of the adapter, but that there is a continually decreasing wall thickness at the end from a maximum at the outer perimeter or circumference of the body portion, to minimum adjacent the aperture in the end wall of the cup. This continuous taper exists throughout the end, and not only in the generally transverse portion 16A, but also in the collar portion 17.

FIG. 5 shows the inversion of the flange portion upon insertion of a tube in the direction of the arrow. Then, the flange portion will be reverted or restored to its original direction of extension away from the open end of the cup, as the tube is pulled out. The end of the adapter is spaced from the end of the Y connector to provide an opportunity for the adapter wall to bulge outwardly and accommodate any extra radial expansion needed for insertion of comparatively large tubes. In addtion, the tapered configuration aids in this adapting ability without the type of relative size limitation mentioned in the Canadian patent referred to above. Moreover, the tapered flange whereby the outer surface of the flange, when in the configuration shown in FIGS. 2 through 4 and 6, is very nearly tangent the exterior surface of the tube received therein, enables a very smooth taped joint as in FIG. 6, where a very small tube 22 is used, one which is almost as small as the original free interior diameter of the aperture in the collar end of the adapter. Thus the tape serves the additional function of guaranteeing both a snug fit and a gas-tight seal. Otherwise, simply the surface friction between the interior surface of the adapter at the aperture, and the outer surface of the tube at the aperture, provides the necessary tightness for the secure retention of the tube in the adapter, and for the gas-tight seal as well.

The invention claimed is:

1. An adapter for connections between two tubes of different sizes comprising:
   a generally circular cup-shaped body of flexible resilient material, said body in its relaxed condtition having a top and bottom, with a large open end at the top, and an aperture in the bottom, said aperture having a flange extending axially from the bottom in a direction away from the open end of the cup;
   the material thickness at the aperture being less than the thickness at the open end;
   the bottom varying in thickness from a minimum at the aperture to a maximum at the outer circumference of the bottom;
   said bottom being generally funnel-shaped, and
   the bottom, including the flange, being invertible upon insertion of a tube therein having an outside diameter greater than the inside diameter of the flange, and returnable to its normal direction of extension upon removal of the tube.

* * * * *